United States Patent Office 3,836,457
Patented Sept. 17, 1974

3,836,457
SYSTEM FOR CONCENTRATING SOLUTIONS BY LOW PRESSURE RECYCLING
Marvin C. Gross, Maple Shade, N.J., and Regis R. Stana, Murrysville, Franklin D. Klem, Pittsburgh, and Raymond E. Shaffer, Greensburg, Pa., assignors to Westinghouse Electric Corporation, Pittsburgh, Pa.
Filed Mar. 19, 1973, Ser. No. 342,572
Int. Cl. B01d 13/00, 31/00
U.S. Cl. 210—23
10 Claims

ABSTRACT OF THE DISCLOSURE

A fluid concentration system is operated by (1) pumping a feed solution of low concentration, having an osmotic pressure below about 600 p.s.i., into a first stage reverse osmosis membrane separation apparatus operating at a driving pressure of up to about 800 p.s.i., to provide a first lower concentrate solution and a first high concentrate solution; (2) pumping the high concentrate solution into a second stage reverse osmosis membrane separation apparatus, operating at a driving pressure of up to about 800 p.s.i., to provide an intermediate low concentrate solution and a second high concentrate solution, having an osmotic pressure of between about 800 to 3000 p.s.i.; and (3) recycling at least one of the low concentrate solutions back through at least one of the reverse osmosis membrane separation apparatus.

BACKGROUND OF THE INVENTION

This invention relates to a fluid concentration system, comprising a plurality of staged and at least one recycle reverse osmosis apparatus, which will allow a feed of low concentration of solute in a solvent and low osmotic pressure to be concentrated to a product of high osmotic pressure, without employing pressures significantly above the irreversible compaction pressure for cellulose ester or cellulose ether reverse osmosis membranes.

Osmosis occurs when two solutions of different solute concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration, or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to describe this process. Reverse osmosis systems have application in many areas such as making potable water from brackish or polluted water, cleaning up waste streams and concentrating aqueous solutions such as cheese whey, tomato juice and tobacco leaf extract.

In concentrating a feed solution by reverse osmosis, the degree to which the solution can be concentrated is limited by the operating pressure of the system and the osmotic pressure of the concentrated solution. As driving pressure is increased, flux increases almost in direct proportion. However, if a membrane is subjected to high pressures for extended periods of time it suffers physical deformation that reduces the flux. The damage is caused by compaction of the porous layer behind the osmotic skin of the membrane.

Compaction for cellulose ester and cellulose ether reverse osmosis membranes has a detectable threshold at pressures above about 450 p.s.i., and becomes more rapid with further increases in driving pressure. Continued pressure above 450 p.s.i. causes the spongy cellulosic sublayer to deform, due to plastic flow of the loosely ordered polymer chains. However, pressures generally up to about 800 p.s.i. can be employed without a severe rate of compaction. Any compaction is compensated for by the higher fluxes generated at the higher pressure. At driving pressures above about 800 p.s.i., the compaction rate becomes dramatic, and the life of the membrane is so shortened as to make operation unattractive; for example, membrane life can be shortened by a factor of 3, between continuous operation at 800 p.s.i. and 1200 p.s.i. pump driving pressures.

When the osmotic pressure difference between the concentrated solution and the permeate approaches the maximum pumping pressure of the system, the membrane flux will tend to zero, and further concentration will not take place, even ignoring membrane compaction. The maximum pumping pressure of most reverse osmosis systems is 1000 to 1500 p.s.i. However, there are many solutions, such as tomato juice, orange juice, coffee, whey and tobacco leaf extract, where the desirable concentrate has an osmotic pressure of 2000 to 4000 p.s.i. Thus, it is not economically feasible to concentrate these products at the desired levels because of the large number of pumping stages that would be required.

SUMMARY OF THE INVENTION

Briefly, the above-mentioned problems are solved by concentrating feed solutions, having osmotic pressures up to about 600 p.s.i. using a staged and recycle liquid purification fluid concentration system, without employing pressures significantly above the irreversible compaction pressure for cellulose ester or cellulose ether reverse osmosis membranes. More specifically, low concentrate feed solutions having osmotic pressures below about 600 p.s.i. are concentrated to solutions above about 25 weight percent solids having osmotic pressures above about 800 p.s.i., and generally in the range of about 2000 to 3000 p.s.i., and waste solutions below about 1 weight percent solids by staged operation and recycling, while using driving pressures below about 800 p.s.i., and preferably below about 600 p.s.i., thus avoiding significant irreversible membrane compaction and requiring minimal pumping power, less pump and valve maintenance and no high-pressure components.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
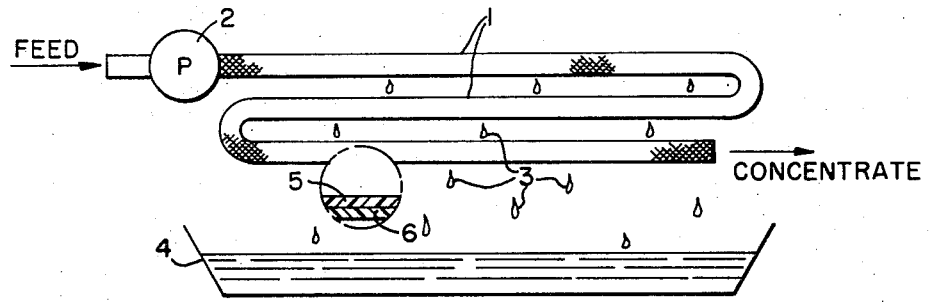
FIG. 1 is a diagram showing the principle for concentrating a feed solution by reverse osmosis.

FIG. 1 illustrates a typical tubular-type reverse osmosis system. Feed solution is pumped through a battery of support tubes 1 constituting the reverse osmosis apparatus.

The feed pump 2 can operate as high as 1500 p.s.i. The tubes can be mounted in batteries of about 150 each. They serve to support the reverse osmosis membrane 5 contained within the tube wall 6. The membrane is usually made of an ether cellulosic derivative such as cellulose acetate, cellulose acetate-butyrate or cellulose propionate, among others, or ester cellulosic derivative such as ethyl cellulose, among others. Generally, modified cellulose acetate is used. The membranes are generally cast from a solution of cellulose acetate, acetone and formamide, and reference can be made to U.S. Pats. 3,170,867; 3,310,488; 3,344,214; 3,446,359; 3,593,855 and 3,657,402 for detailed information concerning these materials and their method of manufacture. These membranes have a dense osmotic skin layer which faces the feed solution and a highly porous spongy sublayer which contacts the membrane support.

The support tube may be made of a variety of materials such as porous fiberglass or perforated stainless steel. The preferred porous tubular support is a casting made from epoxy or phenolic resin bonded filler particles, such as sand, silica, alumina, limestone or any other rigid filler with a granular structure, as described in U.S. Pat. 3,598,241. Of course, flat plate type reverse osmosis modules, which are well known in the art, can be also used to support the membranes in the reverse osmosis apparatus used in the method of this invention. The tube walls that support the reverse osmosis membranes must be able to withstand the pressure exerted on them by the pump and must be able to allow egress of the low concentrate solution 3 into a collecting pan 4.

In the fabrication of the modules preferably used as a support in the method of this invention, a resin, usually in solution, with an added catalyst, is coated onto filler particles in such a way as to leave a thin, dry, uncured film on each filler particle. The resulting particulate composition is free flowing and is cast into a mold of the desired configuration, generally a tubular module having one or more retractable tubes, cores, or other means to form the bores in the module. The mold is then heated to cure the resin. The mold is then cooled and the tubes removed, leaving the bore or bores of the desired configuration in the module. The curing process transforms the filler-resin catalyst composition into a strong, rigid, open pore tubular support of bonded resin coated filler particles, with a thin film of resin bonding each filler particle to the adjacent particles.

The preferred average particle size range of fillers for use in the module construction is between about 50 and 250 microns, although the outer limits are between 40 and 500 microns. Below 40 microns, the resin-filler support tube lacks the desired porosity for low resistance to water flow and above 500 microns the tube does not properly support the omotic membrane.

A variety of resins such as polyglycidyl ethers, polyesters and silicones, can be used to coat the filler particles in the module, but phenolic resins are preferred because they can be bought cheaply and in readily usable form. The weight percent resin that can be used to coat the filler particles used to make the modules of this invention will range from about 1 to 18 percent of the coated filler particle weight. On a volume basis the range would be about 4 to 32 percent resin for the fillers enumerated. Above these ranges the resin will tend to clog up the pores between the filler particles in the tube causing poor effusion of the pure water. Below these ranges the support tube will not be strong enough for the pressures required in this water purification process.

Figure 2:
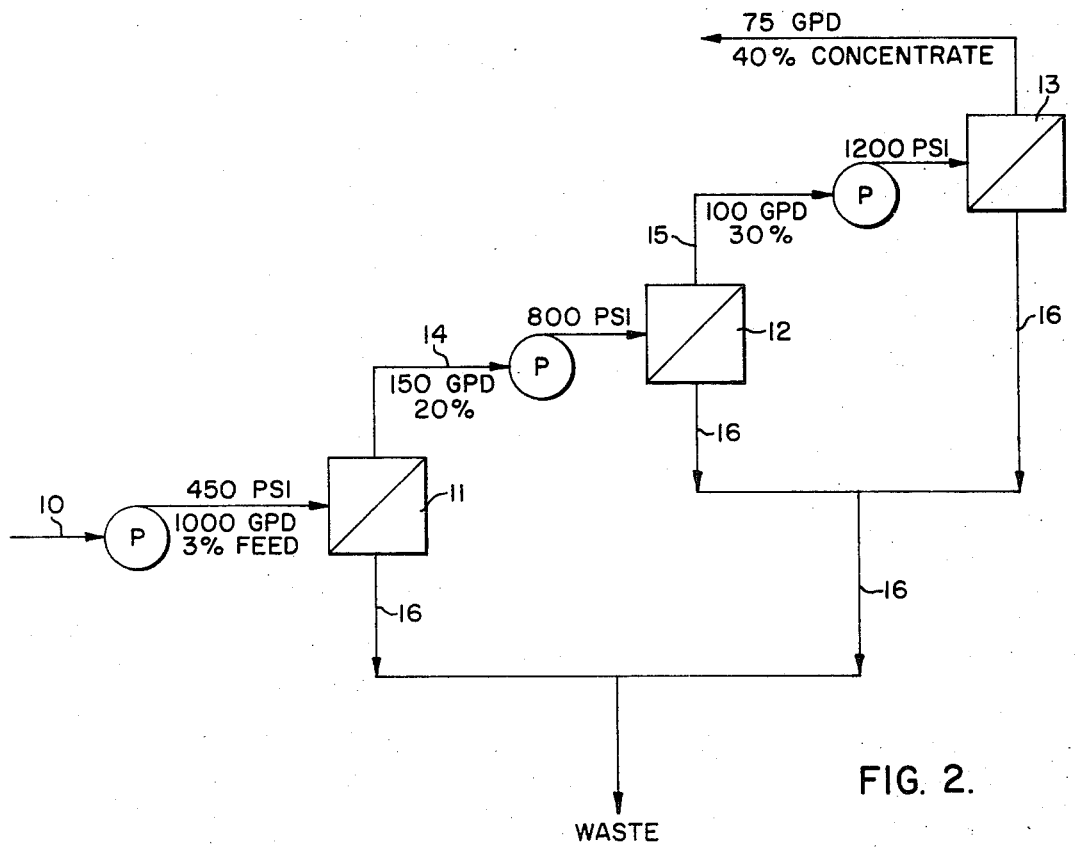
FIG. 2 is a schematic diagram showing the prior art method of concentrating feed solutions by reverse osmosis using a straight concentration system at steady state.

Referring now to FIG. 2, the prior art method of concentrating a low osmotic pressure, 3 weight percent solids lactose feed solution to a high osmotic pressure, 40 weight percent solids lactose solution is shown. A basis of 1000 gallons/day is used in the examples of FIGS. 2 and 3. However, for continuous operation of such a system, much larger flow rates and increased membrane areas would be required. As can be seen, 1000 gallons/day of low concentrate feed solution 10 is fed into a 450 p.s.i. pump, providing driving pressure through a first stage reverse osmosis membrane apparatus 11 having 69.2 sq. ft. of membrane area. A high concentrate solution 14 of 20% solids at 150 gallons/day is then pumped at 800 p.s.i. through a second stage reverse osmosis membrane apparatus 12 having 13.7 sq. ft. of membrane area. A further high concentrate solution 15 of 30% solids at 100 gallons/day must then be pumped at 1200 p.s.i. through the final concentrate reverse osmosis apparatus 13, having 3.5 sq. ft. of membrane area, to provide a 40% solids concentrated solution at 75 gallons/day. Such high operating pressures in the final stage drastically shorten membrane life and require expensive high pressure components. Also, the waste low concentrate streams 16 contain large amounts of solute which can provide pollution problems. To use driving pressures below 800 p.s.i. in this system would require many more pumps and reverse osmosis apparatus.

Figure 3:
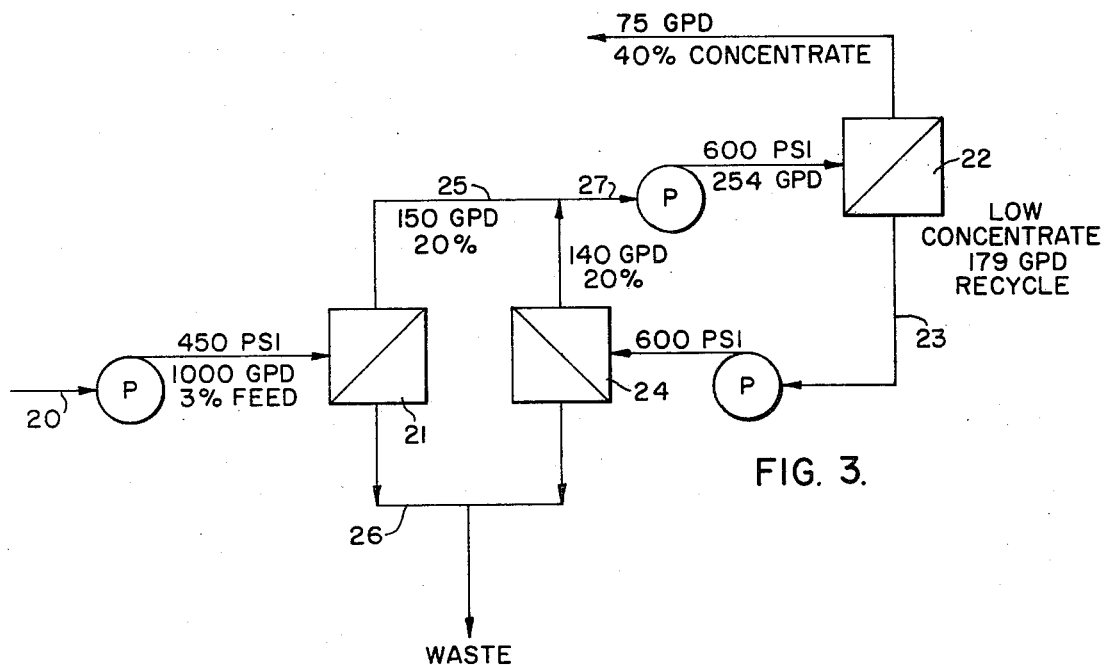
FIG. 3 is a schematic diagram showing concentrating feed solutions by reverse osmosis, using one embodiment of the steady state, low pressure, staged and recycle method of this invention.

FIG. 3 shows one embodiment of the staged and recycle reverse osmosis method of this invention using low pressures and membrane fractionating techniques. As in FIG. 2, a low osmotic pressure, 3 weight percent solids lactose low concentrate feed solution 20 is used. Similarly, 1000 gallons/day of solution is fed into a 450 p.s.i. pump providing driving pressure through first stage reverse osmosis membrane apparatus 21 having 69.2 sq. ft. of membrane area. About 1 percent of the lactose will permeate this membrane. A high concentrate solution 25 of 20% solids at 150 gallons/day is produced along with a low concentrate solution 26. The high concentrate 25 is blended with 104 gallons/day of recycled low concentrate 23 which is pumped through reverse osmosis apparatus 24. The blend in stream 27 is pumped at 600 p.s.i. through a second stage reverse osmosis membrane apparatus 22 having 3.7 sq. ft. of membrane area.

The characteristics of the reverse osmosis membrane in apparatus 22 are such that it is more porous than the membrance in apparatus 21 or 24, such that about 40 percent of the lactose will permeate the membrane reducing the effective osmotic pressure difference that must be overcome. Generally, this final concentrate separation apparatus will only reject 20 to 60% of the solute so that the osmotic pressure difference between the solution fed into the apparatus and the permeate is less than 800 p.s.i. The intermediate low concentrate solution, in stream 23 is pumped at 600 p.s.i. through a third stage recycle reverse osmosis apparatus 24 having 12.6 sq. ft. of membrane area, to further concentrate it to a 20% solids solution at 104 gallons/day which is recycled to blend into stream 25 forming stream 27 leading into reverse osmosis apparatus 22. Aabout 1 percent of the lactose will permeate the membrane, in apparatus 24.

As can be seen from FIG. 3, the process of this invention comprises pumping a low concentrate feed solution having a low osmotic pressure into at least two staged reverse osmosis membrane apparatus containing supported reverse osmosis membranes with associated inlet and outlet means. The reverse osmosis apparatus operate at driving pressures below about 800 p.s.i. and preferably operate below about 600 p.s.i. The feed is separated into a first high concentrate solution and a first low concentrate solution by the initial first stage reverse osmosis apparatus. The higher concentrated solution is pumped into the second stage reverse osmosis apparatus to provide a concentrate product and an intermediate low concentrate. As least one of the low concentrate solutions is then recycled to provide a final concentrate, and a waste containing minimal solute pollutants.

The fluid concentration system comprises inlet means to a first stage reverse osmosis apparatus having a first high and low concentrate outlet stream. The first high concentrate outlet stream is connected to a second stage reverse osmosis apparatus having a second high and low concentrate outlet stream and at least one of the low concentrate outlet streams is recycled through the fluid concentration system.

Example 1

Figure 4:
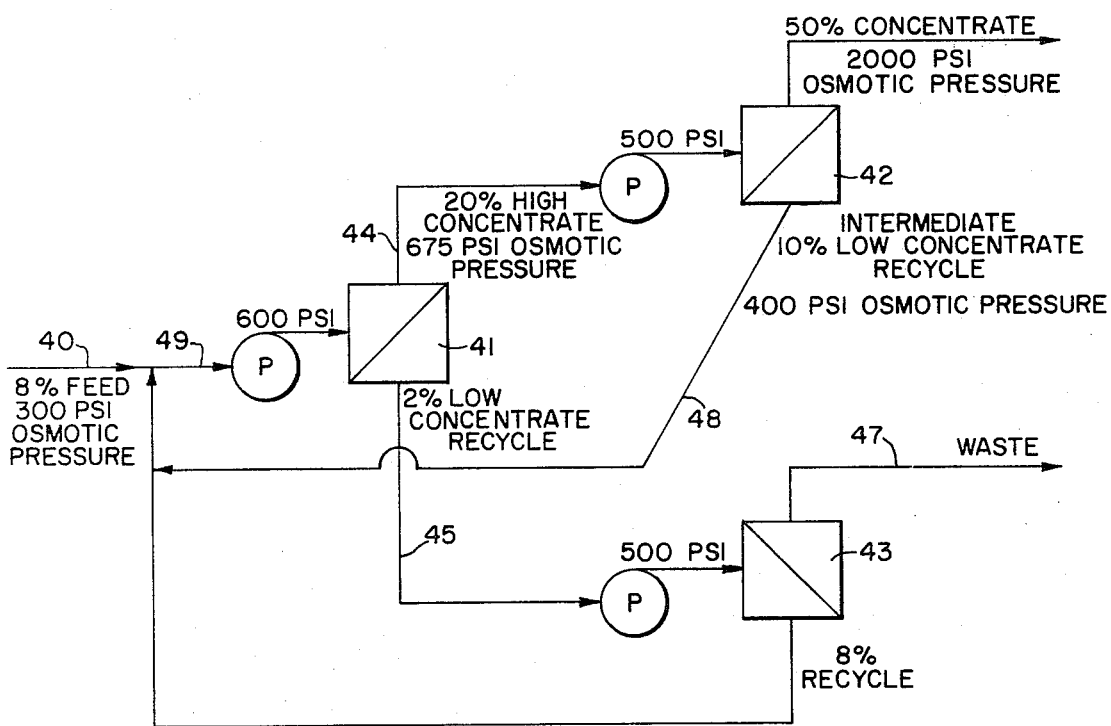
FIG. 4 is a schematic diagram showing concentrating the feed solution of Example 1, using the recycle low pressure method of this invention after a steady state has been reached.

Three reverse osmosis fluid purification apparatus were made, shown in FIG. 4 as first stage apparatus 41, second stage apparatus 42 and third stage recycle apparatus 43. Each apparatus contained series connected reverse osmosis modules, about 4' long and 4" in diameter having 18, ½" diameter, cellulose acetate reverse osmosis membrane containing axial bores. The supports were tubular and made from foundry sand, having an average particle size of about 180 microns, with phenolic resin bonding the sand filler together, the resin constituting about 5 weight percent of the coated filler particle weight. Initial first stage reverse osmosis membrane apparatus 41 contained about 9.25 sq. ft. of membrane area. Recycle reverse osmosis membrane apparatus 43 contained about 9.25 sq. ft. of membrane area and concentrate reverse osmosis membrane apparatus 42 contained about 9.25 sq. ft. of membrane area.

The membrance in apparatus 41 had a NaCl rejection rate of 40%, the membrane in apparatus 42 was more porous than the other membranes in the system and had a NaCl rejection rate of 20%, and the membrane in recycle apparatus 43 had a NaCl rejection rate of 80%. Average fluxes were 15 gal./sq. ft./day for apparatus 41 and 42 and 30 gal./sq. ft./ day for apparatus 43. Apparatus 41 was driven by a 600 p.s.i. pump, apparatus 42 was driven by a 500 p.s.i. pump and recycle apparatus 43 was driven by a 500 p.s.i. pump.

A low concentration feed containing 8 weight percent solids tobacco leaf extract solution 40, having a total osmotic pressure of 300 p.s.i., was pumped into apparatus 41 at 600 p.s.i. The feed contained a mixture of inorganics such as NaCl and KCl, and organic materials. The inorganic fraction comprised about 25 percent of the total solids and contributed about 50 percent of the osmotic pressure. The organics were almost all soluble organics in water such as soluble cellulosics, esters and ethers. Reverse osmosis apparatus 41 separated its input into a first high concentrate stream 44 and a first low concentrate solution stream 45. The high concentrate solution was pumped into second stage concentrate reverse osmosis apparatus 42 at 500 p.s.i. and the solution was separated by reverse osmosis into the final high concentrate and an intermediate low concentrate solution stream 48. The intermediate low concentrate solution 48 was recycled back and combined with the feed solution 40 to form blended stream 49. The low concentrate solution 45 from the initial apparatus 41 was pumped into the third stage recycle reverse osmosis apparatus 43 at 500 p.s.i., and the solution was separated by reverse osmosis into a concentrated stream 46 which was pumped back and blended into the feed solution and stream 48, and a waste stream 47 which had only 0.3% solids and was discarded.

The 8 weight percent solids feed solution blended with recycled 8 weight percent solids, 400 p.s.i. osmotic pressure solution 46 from recycle apparatus 43 and recycled 10 weight percent solids, 400 p.s.i. osmotic pressure solution 48 from final concentrate apparatus 42 was separated into high concentrate 20 weight percent solids, 675 p.s.i. osmotic pressure and 2 weight percent solids, 100 p.s.i. osmotic pressure components, in streams 44 and 45 respectively. The initial 8% feed produced an initial 1% permeate. As the solution passed through the apparatus and was concentrated to 20%, it produced a 4% permeate. The low concentrate recycle solution in stream 45 averaged about 2 weight percent solids. The 2 weight percent component was pumped into recycle apparatus 43 at 500 p.s.i. and was separated into 0.3 weight percent solids waste and 8 weight percent solids component. The 8 weight percent solids component was recycled into the feed stream.

The 20 weight percent component 44 from initial apparatus 41 was pumped into second stage concentrate apparatus 42 at 500 p.s.i. and was separated into an intermediate low concentrate 10 weight percent solids component stream 48, which was recycled into the feed stream, and the final concentrate which was concentrated into a 50 weight percent solids solution, having an osmotic pressure of 2000 p.s.i. The osmotic pressure difference in this final concentrate separation apparatus was 100 p.s.i. The feed in stream 44 produced an initial 7% permeate. As the solution passed through the apparatus and was concentrated to 50%, it produced a 30% permeate. The combined permeate averaged about 10 weight percent solids with an osmotic pressure of about 400 p.s.i.

Thus, it can be seen that an 8 weight percent feed of 300 p.s.i. osmotic pressure was processed to yield a 50 weight percent concentrate of 2000 p.s.i. osmotic pressure and a low pollutant 0.3 weight percent waste stream of 30 p.s.i. osmotic pressure, without employing operating pressures above 600 p.s.i., thus saving on membrane life, pump and valve maintenance and high pressure components and providing a nonpolluting waste stream of very low solids concentration.

We claim:

1. A method of making a concentrated solution of solute in a solvent, having an osmotic pressure over about 800 p.s.i. comprising the steps of:
   (A) pumping a feed solution of low concentration, having an osmotic pressure of up to about 600 p.s.i. through a first stage reverse osmosis membrane at a driving pressure below 800 p.s.i. to provide a first higher concentrate solution and a first low concentrate solution;
   (B) pumping the first higher concentrate solution through a second stage reverse osmosis membrane at a driving pressure below 800 p.s.i. to provide a second higher concentrate solution and a second low concentrate solution;
   (C) pumping at least one of said low concentrate solutions through a recycle reverse osmosis membrane at a driving pressure below 800 p.s.i. to provide a recycle high concentrate solution and a recycle low concentrate solution; and
   (D) recycling the recycle high concentrate solution back into one of said reverse osmosis membranes, other than the recycle reverse osmosis membrane, at a driving pressure below 800 p.s.i.; wherein the second stage reverse osmosis membrane is more porous than the other membranes and will reject 20 to 60% of the solute.

2. The method of claim 1 wherein one of the low concentrate solutions is recycled back into the feed solution.

3. The method of claim 1 wherein one of the low concentrate solutions is recycled back into the first higher concentrate solution.

4. The method of claim 1 wherein the reverse osmosis membrane is selected from the group consisting of cellulose esters and cellulose ethers and is supported by a porous module made of bonded resin coated filler particles.

5. The method of claim 4 wherein the porous support is a tubular module containing at least one axial bore supporting a tubular reverse osmosis membrane, wherein the filler making up the module has an average particle size between about 40 to 500 microns diameter and the resin bonding the particles together comprises from about 1 to 18 percent of the coated filler particle weight.

6. The method of claim 5 wherein the second concentrate solution contains over about 25 weight percent solids.

7. The method of claim 5 wherein the solutions are pumped through the membranes at driving pressures below about 600 p.s.i.

8. A method of making a concentrated solution of solute in a solvent, having an osmotic pressure over about 800 p.s.i., comprising the steps of:

(A) pumping a feed solution of low concentration, through a first stage reverse osmosis membrane at a driving pressure below about 600 p.s.i. to provide a first higher concentrate solution and a first low concentrate solution;

(B) pumping the first higher concentrate solution through a second stage reverse osmosis membrane at a driving pressure below about 600 p.s.i. to provide a second higher concentrate solution and a second low concentrate solution;

(C) pumping the first low concentrate solution through a recycle reverse osmosis membrane at a driving pressure below about 600 p.s.i. to provide a recycle high concentrate solution and a recycle low concentrate solution; and (D) recycling the recycle high concentrate solution and the second low concentrate solution back into the feed solution; wherein the second stage reverse osmosis membrane is more porous than the other membranes and will reject 20 to 60% of the solute.

9. The method of claim 8 wherein the reverse osmosis membrane is selected from the group consisting of cellulose esters and cellulose ethers and is supported by a porous module of bonded resin coated filler particles.

10. The method of claim 9 wherein the porous support is a tubular module containing at least one axial bore supporting a tubular reverse osmosis membrane, wherein the filler making up the module has an average particle size between about 40 to 500 microns diameter and the resin bonding the particles together comprises from about 1 to 18 percent of the coated filler particle weight.

References Cited

UNITED STATES PATENTS 3,617,550 11/1971 Elata et al. _____ 210—23
3,610,418 10/1971 Calderwood _____ 210—490 X FRANK A. SPEAR, JR., Primary Examiner U.S. Cl. X.R.

210—196, 321, 433